(12) United States Patent
Yang (10) Patent No.: US 7,730,347 B1
(45) Date of Patent: Jun. 1, 2010

(54) DATA RECOVERY SYSTEM AND METHOD INCLUDING A DISK ARRAY ARCHITECTURE THAT PROVIDES RECOVERY OF DATA TO ANY POINT OF TIME

(75) Inventor: Qing K. Yang, Saunderstown, RI (US)

(73) Assignee: Board of Governors for Higher Education, State of Rhode Island and Providence Plantations, Providence, RI (US)

(*) Notice: Subject to any disclaimer, the term of this patent is extended or adjusted under 35 U.S.C. 154(b) by 407 days.

(21) Appl. No.: 11/749,901

(22) Filed: May 17, 2007

Related U.S. Application Data (60) Provisional application No. 60/883,181, filed on Jan. 3, 2007.

(51) Int. Cl.
*G06F 11/00* (2006.01)
(52) U.S. Cl. .............................. 714/6; 714/15; 714/20
(58) Field of Classification Search ................ 714/6, 714/15, 20
See application file for complete search history.

(56) References Cited

U.S. PATENT DOCUMENTS

| | | | |
|---|---|---|---|
| 5,341,381 A | 8/1994 | Fuller | |
| 5,526,482 A | 6/1996 | Stallmo et al. | |
| 5,533,190 A * | 7/1996 | Binford et al. | 714/6 |
| 6,243,795 B1 | 6/2001 | Yang et al. | |
| 6,298,415 B1 | 10/2001 | Riedle | |
| 6,480,970 B1 | 11/2002 | DeKoning et al. | |
| 6,523,087 B2 | 2/2003 | Busser | |
| 6,928,526 B1 | 8/2005 | Zhu et al. | |
| 7,231,544 B2 * | 6/2007 | Tan et al. | 714/15 |
| 7,240,237 B2 * | 7/2007 | Delaney | 714/6 |
| 7,310,703 B2 * | 12/2007 | Frolund et al. | 711/114 |
| 7,315,976 B2 * | 1/2008 | Holt | 714/769 |
| 7,457,980 B2 * | 11/2008 | Yang et al. | 714/6 |
| 7,487,394 B2 * | 2/2009 | Forhan et al. | 714/15 |
| 7,533,298 B2 * | 5/2009 | Smith et al. | 714/20 |
| 7,549,083 B2 * | 6/2009 | Eguchi et al. | 714/15 |
| 2005/0060609 A1 * | 3/2005 | El-Batal et al. | 714/20 |
| 2006/0036901 A1 | 2/2006 | Yang et al. | |

(Continued)

OTHER PUBLICATIONS

D.A. Patterson et al., "A case for redundant arrays of inexpensive disks (RAID)," In Proc. of the ACM SIGMOD International Conference on Management of Data, 1988, pp. 109-116.

(Continued)

*Primary Examiner*—Marc Duncan
(74) *Attorney, Agent, or Firm*—Gauthier & Connors LLP (57) ABSTRACT

A storage architecture is disclosed for maintaining data in the event of data storage failure. The storage architecture includes a plurality of disks in a redundant disk array, a time-recovery disk, and an encoder system. Each of the plurality of disks in the redundant disk array includes a parity output bit that provides an indication of the parity of the data in each respective disk. The time-recovery disk is in communication with at least one of the redundant disk arrays. The encoder system is coupled to the parity output bit of the at least one of the disks and is coupled to the time-recovery disk for providing encoding data regarding whether a block of data in the at least one disk has been changed.

17 Claims, 7 Drawing Sheets

U.S. PATENT DOCUMENTS

2008/0201608 A1* 8/2008 Forhan et al. .................. 714/15
2008/0282105 A1* 11/2008 Deenadhayalan et al. ...... 714/6

OTHER PUBLICATIONS

M. Blaum et al., "EVENODD: An optimal scheme for tolerating double disk failures in RAID architectures," In Proc. of the 21st Annual International Symposium on Computer Architecture, Denver, CO, 1997.

G.A. Alvarez et al., "Tolerating multiple failutes in RAID architectures with optimal storage and uniform declustering," In Proc. of the 24th Annual International Symposium on Computer Architecture, Denver, CO. 1997.

P. Corbett et al., "Row-Diagonal parity for double disk failure correction," In Proc. of the 3rd USENIX Conference on FAST, San Francisco, CA, Mar. 2004.

D.M. Smith, "The cost of lost data," Journal of Contemporary Business Practice, vol. 6, No. 3, 2003.

D. Patterson et al., "Recovery oriented computing (ROC): Motivation, Definition, Techniques, and Case Studies," Computer Science Technical Report UCB/CSD-021175, U.C. Berkeley, Mar. 15, 2002.

K. Keeton et al., "Designing for disasters," In Proc. of 3rd Conference on File and Storage Technologies, San Francisco, CA, 2004.

C.B. Morrey III et al., "Peabody: The time traveling disk," In Proc. of IEEE Mass Storage Conference, San Diego, CA, Apr. 2003.

L.P. Cox et al., "Pastiche: making backup cheap and easy," In Proc. of the 5th USENIX Symposium on Operating System Design and Implementation, Boston, MA, Dec. 2002.

E. K. Lee et al., "Petal: Distributed virtual disks," In Proc. of the 7th International Conference on Architecture Support for Programming Languages and Operating Systems (ASPLOS-7), Cambridge, MA, 1996.

J.J. Kistler et al., "Disconnected operation in the Coda file system," In Proc. of 13th ACM Symposium on Operating System Principles, Pacific Grove, CA, Oct. 1991.

Z. Peterson et al., "Ext3cow: A Time-Shifting File System for Regulatory Compliance," ACM Transactions on Storage, vol. 1, No. 2, 2005, pp. 190-212.

N. C. Hutchinson et al., "Logical vs. Physical file system backup," In Proc. of 3rd Symposium on Operating System Design and Implementation, New Orleans, LA, Feb. 1999, pp. 239-250.

S. Quinlan et al., "Venti: a new approach to archival storage," In Proc. of the 2002 Conference on File and Storage Technologies, Monterey, CA, Jan. 2002, pp. 89-101.

D. S. Santry et al., "Deciding when to forget in the Elephant file system," In Prov. of 17th ACM Symposium on Operating System Principles, Charleston, SC, Dec. 1999, pp. 110-123.

A. Sankaran et al., "Volume Shadow Copy Service," www.dell.com/powersolutions, Mar. 2004.

D. Hitz et al., "File system design for an NFS file server appliance," In Proc. of the USENIX Winter Technical Conference, San Francisco, CA, 1994, pp. 235-245.

W. Xiao et al., "Implementation and Performance Evaluation of Two Snapshot Methods on iSCSI Target Storages," In Proc. of NASA/IEEE Conference on Mass Storage Systems and Technologies, May 2006.

G.A. Gibson et al., "Network Attached Storage Architecture," Communications of the ACM, vol. 43, No. 11, Nov. 2000, pp. 37-45.

C.A.N. Soules et al., "Metadata efficiency in versioning file systems," In Proc. of the 2nd USENIX Conference on File and Storage Technologies, San Francisco, CA, Mar. 2003, pp. 43-58.

S. Rhea et al., "Pond: The OceanStore prototype," In Proc. of the 2dn USENIX Conference on File and Storage Technologies (FAST), San Francisco, CA, Mar. 2003.

A. Muthitacharoen et al., "A low-bandwidth network file system," In Proc. of the Eighteenth ACM Symposium on Operating Systems Principles, Alberta, Canada, Oct. 2001.

K. Muniswamy-Reddy et al., "A versatile and user-oriented versioning file system," In Proc. of the 3rd USENIX Conference on File and Storage Technologies, San Francisco, CA, 2004.

M. Ji et al. "Seneca: remote mirroring done write," In Prov. of the 2003 USENIX Annual Technical Conference, San Antonio, TX, 2003, pp. 253-268.

M. Sivathanu et al., "A Logic of File Systems," In Proc. of 4th USENIX Conference on File systems and Storage Technologies, 2005.

Y. Hu et al. "DCD—Disk Caching Disk: A New Approach for Boosting I/O Peformance," In 23rd Annual International Symposium on Computer Architecture (ISCA), Philadelphia, PA, May 1996.

H.W. Cain et al., "An Architectural Evaluation of Java TPC-W," HPCA 2001, Nuevo Leone, Mexico, Jan. 2001.

* cited by examiner

DATA RECOVERY SYSTEM AND METHOD INCLUDING A DISK ARRAY ARCHITECTURE THAT PROVIDES RECOVERY OF DATA TO ANY POINT OF TIME

PRIORITY

This application claims priority to U.S. Provisional Patent Application Ser. No. 60/883,181 filed Jan. 3, 2007.

GOVERNMENT RIGHTS NOTICE

The present invention was made, at least in part, with support from the United States government under Grant (Contract) Number, CCR-0312613, awarded by the National Science Foundation. The United States government has certain rights to this invention.

BACKGROUND

The invention generally relates to the field of redundant data storage systems, and relates in particular to data storage system architectures that include disk arrays.

A conventional disk array system architecture is known as the RAID system architecture that includes a redundant array of independent/inexpensive disks (RAID). The RAID system architecture provides a large amount of data storage in a reasonably reliable manner. Several popular RAID system architectures are set forth in the paper entitled *A Case for Redundant Arrays of Inexpensive Disks (RAID)*, Patterson et al., Proc. ACM SIGMOD International Conference on Management of Data, pp. 109-116, June 1988. These architectures include RAID-1, RAID-2, RAID-3, RAID-4 and RAID-5 system architectures. U.S. Pat. No. 5,526,482 briefly discusses each of these architectures.

In general, each of the RAID system architectures includes a plurality of disks that are controlled by a disk controller. When a central processing unit (CPU) sends information to the disk controller for storage on disk, the controller directs how the information shall be stored on the plurality of disks to ensure that a failure of any one of the disks will not cause the system to lose information. RAID-1 provides 2N data redundancy to protect data while RAID-3 through RAID-5 store data in parity stripes across multiple disks to improve space efficiency and performance over RAID-1. The parity of a stripe is the Exclusive-OR (XOR) of all data elements in the stripe. If a disk failed at time t0, and the system found such a failure at time t1, the data in the failed disk can be recovered by doing the XOR among the good disks, which may finish at t2. The recovered data is exactly the same image of the data as it was at time t0. Further conventional RAID architecture systems seek to recover data from failures of more than one disk.

With the rapid advances in networked information services coupled with the maturity of disk technology, data damage and data loss caused by human errors, software defects, virus attacks, power failures, or site failures have become more dominant, accounting for an estimated 60% to 80% of data losses. Current RAID architecture systems cannot protect data from these kinds of failures because damaged data are not confined to one or two disks. Traditional techniques protecting data from the above failures are mainly periodical (daily or weekly) backups and snapshots. These techniques usually take a significant amount of time to recover data. In addition, data between backups is vulnerable to data loss. Recent research has shown that data loss or data unavailability may cost up to millions of dollars per hour in many businesses. Solely depending on the traditional time-consuming backups is no longer adequate for today's information age.

Recovery of data is generally measured by two key parameters: recovery point objective (RPO) and recovery time objective (RTO). RPO measures the maximum acceptable age of data at the time of outage. For example, if an outage occurs at time t0, and the system found the outage at time t1, the ideal case is to recover data as it was right before t0, or as close to t0 as possible. A daily backup would represent RPO of approximately 24 hours because the worst-case scenario would be an outage during the backup, i.e., t0 is the time point when a backup is just started. RTO is the maximum acceptable length of time to resume normal data processing operations after an outage. RTO represents how long it takes to recover data. For the above example, if data is successfully recovered at time t2 after starting the recovery process at t1, then the RTO is t2−t1. Depending on the different values of RPO and RTO, there exist different storage architectures capable of recovering data upon an outage.

Data protection and recovery have traditionally been done using periodic backups and snapshots. Backups are typically done nightly when data storage is not being used since the process is time consuming and degrades application performance. During the backup process, user data is transferred to a tape, a virtual tape, or a disk for disk-to-disk backup. Full backups may be performed weekly or monthly with daily incremental backups occurring between the full backups.

Data compression is often used to reduce backup storage space. A snapshot is a point-in-time image of a collection of data allowing on-line backup. A full-copy snapshot creates a copy of the entire data as a read only snapshot storage clone. To save space, copy-on-write snapshot copies a data block from the primary storage to the snapshot storage upon the first write to the block after the snapshot was created. A snapshot may also redirect all writes to the snapshot storage after the snapshot was created. Such data back-up systems, however, remain costly and highly intrusive batch operations that are prone to error and consume an exorbitant amount of time and resources. As a result, the recovery-time-objective of backups is generally very long. Furthermore, data between two subsequent backups is vulnerable giving rise to high recovery-point-objective.

Besides periodic data backups, data may also be protected at file system level using file versioning that records a history of changes to files. Typically, users need to create versions manually in these systems. There are also copy-on-write versioning systems that have automatic versions for some file operations. File versioning provides a time-shifting file system that allows a system to recover to a previous version of files. These versioning file systems have controllable RTO and RPO, but they are generally file system dependent and may not be directly applicable to enterprise data centers that use different file systems and databases. File versioning differs from periodic backups and snapshots in that file versioning works mainly at file system level not at block device level. Block level storages usually provide high performance and efficiency especially for applications such as databases that access raw devices.

To provide timely recovery to any point-in-time at block device level, a log of changed data for each data block may be maintained in a time sequence. In the storage industry, this type of storage is usually referred to as CDP (Continuous Data Protection) storage. In such systems, a write operation will replace the old data in the same logic block address (LBA) to another disk storage instead of overwriting it. As a result, successive writes to the same LBA will generate a sequence of different versions of the block with associated timestamps indicating the time of the corresponding write operations. These replaced data blocks are stored in a log structure, maintaining a history of the data blocks that have been modified. Since every change on a block is kept, it is possible to view a storage volume as it existed at any point in time, dramatically reducing RPO. The RTO depends on the size of the storage for the logs, indexing structure, and consistency checks. The data image at the time of an outage is considered to be crash consistent at block level because the orders of all write operations are strictly preserved.

A significant drawback of the CDP storage is the large amount of storage space required, which has thus far prevented it from being widely adopted. Typically, about 20% of active storage volumes change per day, with an average of 5 to 10 overwrites to a block. Considering one terabyte data storage, a CDP storage will require one to two terabytes of space to store the logs reflecting data changes in one day. A week of such operations will require 5 to 10 terabytes of storage space.

There is a need, therefore, for an improved redundant data storage system, and in particular, for a system architecture for recovering data at time t2 to the data image of t0 after it is discovered at time t1 that data was damaged by human errors, software defects, virus attacks, power failures, or site failures.

SUMMARY

A storage architecture is provided that maintains data in the event of data storage failure. The storage architecture includes a plurality of disks in a redundant disk array, a time-recovery disk, and an encoder system in accordance with an embodiment of the invention. Each of the plurality of disks in the redundant disk array includes a parity output bit that provides an indication of the parity of the data in each respective disk. The time-recovery disk is in communication with at least one of the redundant disk arrays. The encoder system is coupled to the parity output bit of the at least one of the disks and is coupled to the time-recovery disk for providing encoding data regarding whether a block of data in the at least one disk has been changed.

In accordance with another embodiment, the storage architecture includes a plurality of disks in a redundant disk array, an exclusive OR functionality circuit, an encoder circuit, a time stamp circuit, and a time-recovery disk. The plurality of disks in the redundant disk array each comprise a parity output bit that provides an indication of the parity of the data in each respective disk. The exclusive OR functionality circuit is for providing an exclusive OR function of a parity output bit of at least one of the plurality of disks in the redundant disk array. The encoder circuit is coupled to an output of the exclusive OR functionality circuit. The time stamp circuit is coupled to the encoder circuit. The time-recovery disk is coupled to the encoder circuit and is for receiving a plurality of parity logs from the encoder circuit responsive to the output of the exclusive OR functionality circuit and responsive to an output of the time stamp circuit. The parity log includes encoded data that is indicative of whether a block of data in the at least one disk has been changed.

In accordance with a further embodiment, the invention provides a method of maintaining data in the event of data storage failure. The method includes the step of providing a plurality of disks in a redundant disk array, each comprising a parity output bit that provides an indication of the parity of the data in each respective disk, at least one of the plurality of disks providing an exclusive OR function of a parity output bit of the at least one of the plurality of disks in the redundant disk array. The method also includes the steps of encoding data provided by the exclusive OR functionality of the parity output bit to provide encoded data, time stamping the encoded data with a time stamp circuit that is coupled to the encoded data to provide time stamped encoded data, and providing the time stamped encoded data to a time-recovery disk.

BRIEF DESCRIPTION OF THE DRAWINGS

The following description may be further understood with reference to the accompanying drawings in which.

The drawings are shown for illustrative purposes only.

DETAILED DESCRIPTION

The invention involves a new disk array architecture that provides timely recovery to any point-in-time, referred to as TRAP-Array. A system that reduces the amount of data to be stored and transferred in a networked storage system, for example, is disclosed in U.S. Published Patent Application No. 2006/0036901, the disclosure of which is hereby incorporated by reference. TRAP-Array stores not only the data stripe upon a write to the array, but also the time-stamped Exclusive-ORs of successive writes to each data block. By leveraging the Exclusive-OR operations that are performed upon each block write in conventional RAID-4 and RAID-5 controllers, TRAP does not incur noticeable performance overhead. More importantly, TRAP is able to recover data very quickly to any point-in-time upon data damage by tracing back the sequence and history of Exclusive-ORs resulting from writes. The TRAP architecture is space-efficient.

A prototype TRAP architecture has been implemented using software at block device level and extensive performance measurements have been carried out using TPC-C benchmark miming on Oracle databases (sold by Oracle International Corporation of Redwood City, Calif.) and PostgreSQL databases (sold by Sun Mircosystems, Inc. of Santa Clara, Calif.), TPC-W running on MySQL database (sold by MySQL of MySQL AB of Sweden), and file system benchmarks running on Linux systems (sold by Linux Networx, Inc. of Bluffdale, Utah) and Windows systems (sold by Microsoft Corporation of Redmond Wash.). Experiments have demonstrated that TRAP is not only able to recover data to any point-in-time very quickly upon a failure but it also uses less storage space than traditional daily differential backup/snapshot. Compared to the state-of-the-art continuous data protection technologies, TRAP saves disk storage space by one to two orders of magnitude with a simple and a fast encoding algorithm. From an architecture point of view, TRAP-Array opens up another dimension for storage arrays. It is orthogonal and complementary to RAID in the sense that RAID protects data in the dimension along an array of physical disks while TRAP protects data in the dimension along the time sequence.

The idea of the TRAP architecture generally involves computing XORs among changed data blocks along the time dimension to improve performance and space efficiency, rather than providing full redundancy of data in time dimension, i.e., keeping a log of all previous versions of changed data blocks in time sequence. With a direct and fast encoding scheme, the TRAP architecture presents dramatic space savings because of content locality that exists in real world applications. Furthermore, it provides faster data recovery to any-point-in-time than traditional techniques because of the drastically smaller amount of storage space used.

A prototype of the new TRAP architecture was implemented at block device level using standard iSCSI protocol. The prototype is a software module inside an iSCSI target mountable by any iSCSI compatible initiator. The TRAP prototype was installed on PC-based storage servers as a block level device driver and experimental performance evaluation as compared to traditional data recovery techniques was conducted. Measurement results show up to 2 orders of magnitude improvements of the new TRAP architecture over existing technologies in terms of storage space efficiency. Such orders of magnitude improvements are practically important given the exponential growth of data.

Data recovery experiments were carried our by selecting any point-in-time in the past and recovering data to the time point. Experiments have shown that all recovery attempts were successful. Recovery time of the new TRAP architecture is compared with existing reliable storage architectures to show that the new TRAP architecture can recover data to any point-in-time very quickly. Again, instead of keeping all versions of a data block as it is being changed by write operations, TRAP systems of the invention keep a log of parities as a result of each write on the block.

Figure 1:
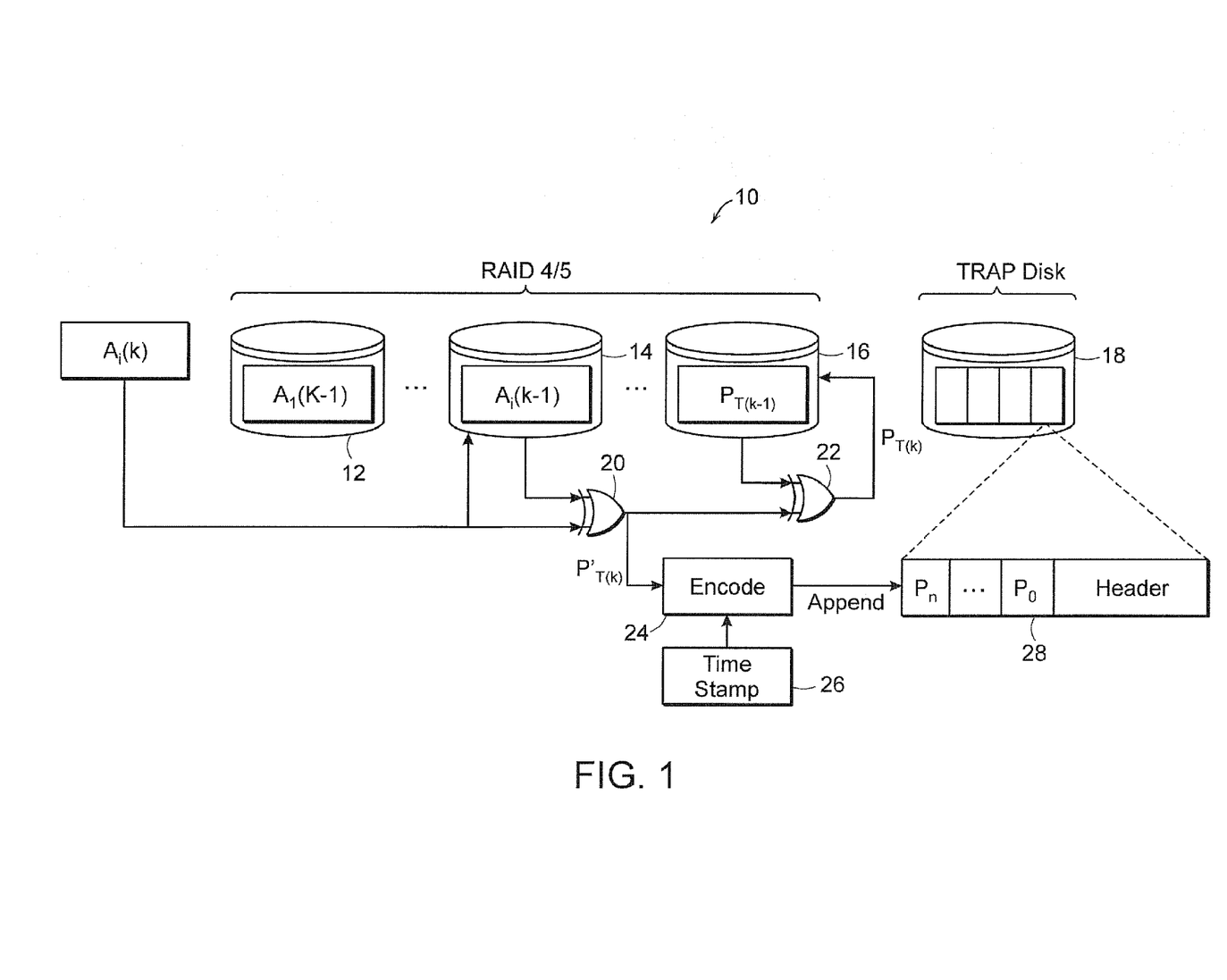
FIG. 1 shows an illustrative diagrammatic operational view of a block diagram of a system in accordance with an embodiment of the invention.

FIG. 1 shows the basic design of an operational view of a system of the invention. As shown in FIG. 1, such a system 10 includes a plurality of data storage disks 12, 14, 16 in a redundant array of inexpensive discs (RAID) system such as a RAID-4 or RAID-5 system as discussed above. The system also includes a TRAP disk 18 and a plurality of bit-wise exclusive OR functionality components 20, 22 that are coupled to the RAID disks. Suppose that at time T(k), the host writes into a data block with logic block address A, as shown that belongs to a data stripe (A1, A2 ... Ai, ... An). The RAID controller including disks 14, 16 and 18 performs the following operation to update its parity disk:

$$P_{T(k)} = A_i(k) \oplus A_i(k-1) \oplus P_{T(k-1)} \qquad (1)$$

where PT(k) is the new parity for the corresponding stripe, $A_i(k)$ is the new data for data block $A_i$, $A_i(k-1)$ is the old data of data block $A_i$, and PT(k−1) is the old parity of the stripe.

Leveraging this computation, the system appends the first part of the above equation, i.e., P'T(k)=$A_i(k) \oplus A_i(k-1)$, to the parity log stored in the TRAP disk after an encoding circuit 24 that is coupled to a time stamp circuit 26 as shown in FIG. 1.

The encoding may be implemented in either hardware or software, and may provide run-length encoding or any type of compression algorithm. A time stamp is provided to each block of encoded data $P_n$ and each block of encoded data $P_n$ has a variable length that depends on, for example, the number of non-zero bits encountered in the $A_i$. The appended blocks of data $P_n$ include a header, and together form a parity log 28 that is stored in the TRAP disk 18. In further embodiments, further disks $A_{i-n}$ or $A_{i+n}$ may also include encoder and time stamp circuits coupled to the parity output bit of each disk for generating parity log data that is stored in a TRAP disk.

Experiments have demonstrated a very strong content locality that exists in real world applications. For the workloads studied, only 5% to 20% of bits inside a data block actually change on a write operation. The parity, P'T(k), reflects the exact changes at bit level of the new write operation on the existing block. As a result, this parity block contains mostly zeros with a very small portion of bit stream that is nonzero. Therefore, it can be easily encoded to a small size parity block to be appended to the parity log reducing the amount of storage space required to keep track of the history of writes.

Now consider the parity log corresponding to a data block, $A_i$, after a series of write operations. The log contains (P'T(k), P'T(k−1), ..., P'T(2), P'T(1)) with time stamps T(k), T(k−1), T(2), and T(1) associated with the parities. Suppose that an outage occurred at time t1, and it is desired to recover data to the image as it was at time t0 (t0≦t1). To do such a recovery, for each data block $A_i$, the largest T(r) in the corresponding parity log is identified such that T(r)≦t0. The following computation is then performed:

$$A_i(r) = P'T(r) \oplus P'T(r-1) \oplus \ldots \oplus P'T(1) \oplus A_i(0) \qquad (2)$$

where $A_i(r)$ denotes the data image of $A_i$ at time T(r) and $A_i(0)$ denotes the data image of $A_i$ at time T(0). Note that:

$$P'T(l) \oplus A_i(l-1) = A_i(l) \oplus A_i(l-1) \oplus A_i(l-1) = A_i(l)$$

for all l=1, 2, ... r. Therefore, this equation gives $A_i(r)$ correctly assuming that the original data image, $A_i(0)$, exists.

The above process represents a typical recovery process upon an outage that results in data loss or data damage while earlier data is available in a full backup or a mirror storage. An undo process is also possible with the parity log if the newest data is available by doing the following computation instead of the above equation:

$$A_i(k) = A_i(k) \oplus P'T(k) \oplus P'T(k-1) \oplus \ldots \oplus P'T(r+1) \qquad (3)$$

where $A_i(k)$ represents the latest data of block $A_i$.

A software prototype of a system of the invention was designed and implemented. The software prototype is a block level device driver below a file system or database systems. As a result, the implementation is file system and application independent. Any file system or database applications may readily run on top of a system of the invention. The prototype driver takes write requests from a file system or database system at block level. Upon receiving a write request, the system performs normal write into the local primary storage and at the same time performs parity computation as described above to obtain P'. The results of the parity computation are then appended to the parity log corresponding to the same LBA to be stored in the TRAP storage.

Figure 2:
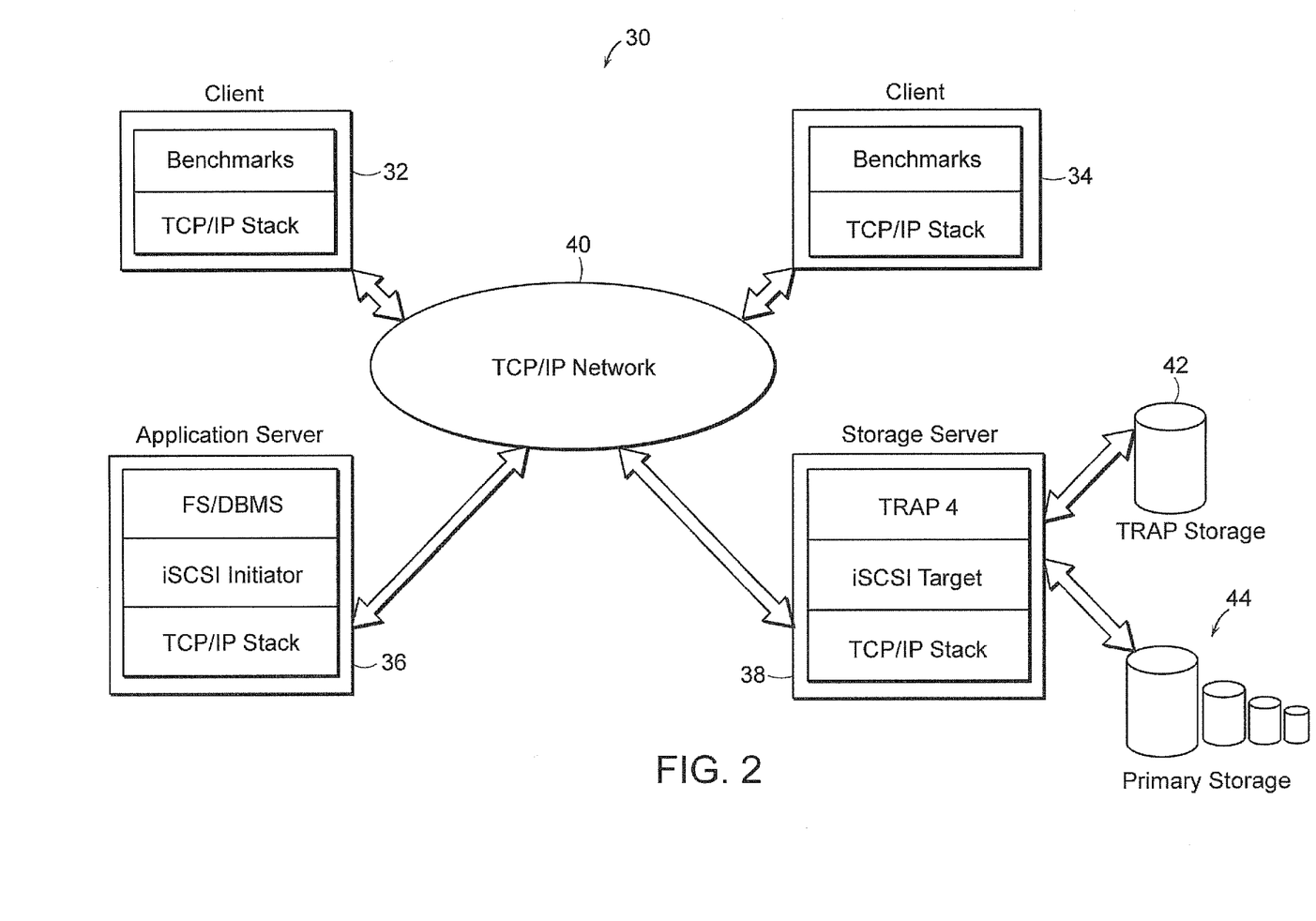
FIG. 2 shows an illustrative diagrammatic view of a system in accordance with the invention implemented in a network system that includes a plurality of servers.

The implementation is done using the standard iSCSI protocol, as shown in FIG. 2. In particular, FIG. 2 shows a network based system 30 that includes a plurality of client stations 32, 34 as well as an application server 36 and a storage server 38 that are all connected to a network 40. The storage server is also connected to a TRAP storage unit 42 and to a primary storage 44. In the iSCSI protocol, there are two communication parties, referred to as iSCSI initiator and iSCSI target. An iSCSI initiator runs under the file system or database applications as a device driver. As I/O operations come from applications, the initiator generates I/O requests using SCSI commands wrapped inside TCP/IP packets that are sent to the iSCSI target. The TRAP module is implemented inside the iSCSI target as an independent module. The main functions inside the TRAP module include parity computation, parity encoding, and logging. The parity computation part calculates P'T(k) as discussed above.

The implementation works on a configurable and fixed block size, referred to as parity block size. Parity block size is the basic unit based on which parity computation is done. All disk writes are aligned to the fixed parity block size. As a result, a disk write request may be contained in one parity block or may go across several blocks depending on the size and starting LBA of the write. The parity encoding part uses the open-source library to encode the parity before appending it to the corresponding parity log. The logging part organizes the parity log, allocates disk space, and stores the parity log in the TRAP disk. The TRAP module runs as a separate thread parallel to the normal iSCSI target thread. It communicates with the iSCSI target thread using a shared queue data structure.

As shown in FIG. 2, the implementation is on top of the standard TCP/IP protocol. As a result, the system may be set up at a remote site from the primary storage through an Internet connection. Together with a mirror storage at the remote site, the system may protect important data from site failures or disaster events.

A recovery program for the system was also implemented. For a given recovery time point (RPO), tr, the recovery program retrieves the parity log to find the timestamp, T(r), such that T(r)≦tr, for every data block that have been changed. The parity blocks were then decoded, and the XOR functionalities were then computed using either Equation (2) or Equation (3) to obtain the data block as it was at time tr for each block. Next, the computed data were stored in a temporary storage. Consistency check was then performed using the combination of the temporary storage and the mirror storage. The consistency check may do several times until the storage is consistent. After consistency was checked, the data blocks in the temporary storage were stored in-place in the primary storage and the recovery process is complete.

Figure 3:
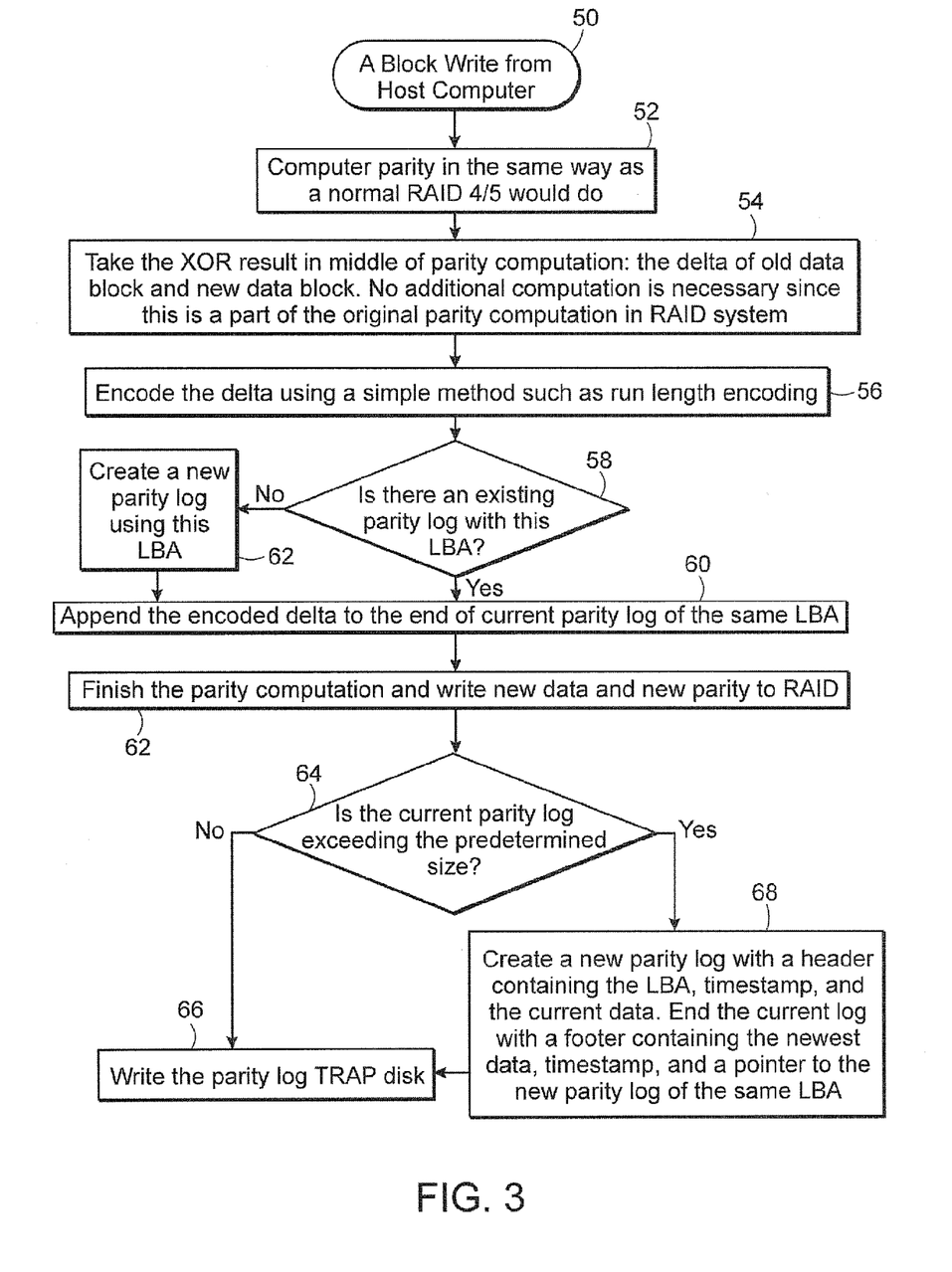
FIG. 3 shows an illustrative flowchart of a write operation in a system in accordance with an embodiment of the invention.

FIG. 3 shows a flowchart illustrating a write operation in a system in accordance with an embodiment of the invention. The write operation begins with a block write instruction from a host computer (step 50). A computer parity is then performed as would be done in a conventional RAID-4 or RAID-5 system (step 52). An Exclusive OR operation is then performed in the middle of the parity computation (step 54). The delta of the old data block and the new data block is determined. No additional computation is performed at this time since this computation is present in the RAID-4 and RAID-5 systems. The delta is then encoded (step 56) using a method such as run length encoding. The system then determines whether there is an existing parity log with this logical block address (step 58).

If there is an existing parity log with the logical block address (LBA), then the system will append the encoded delta to the end of the current parity log of the same LBA (step 60). If there is not an existing parity log the LBA, then the system will first create a new parity log using the LBA (step 62) and then append the encoded delta to the end of that parity log, which becomes the current parity log (step 60). The parity computation is then finished, and the new data and new parity are then written to the RAID disks (step 62). The system then determines whether the current parity log exceeds a predetermined size (step 64), and if not, the parity log is written to the TRAP disk (step 66). If the current parity log does exceed the predetermined size, then a new parity log is created with a header containing the LBA, timestamp, and current data (step 68).

Figure 4:
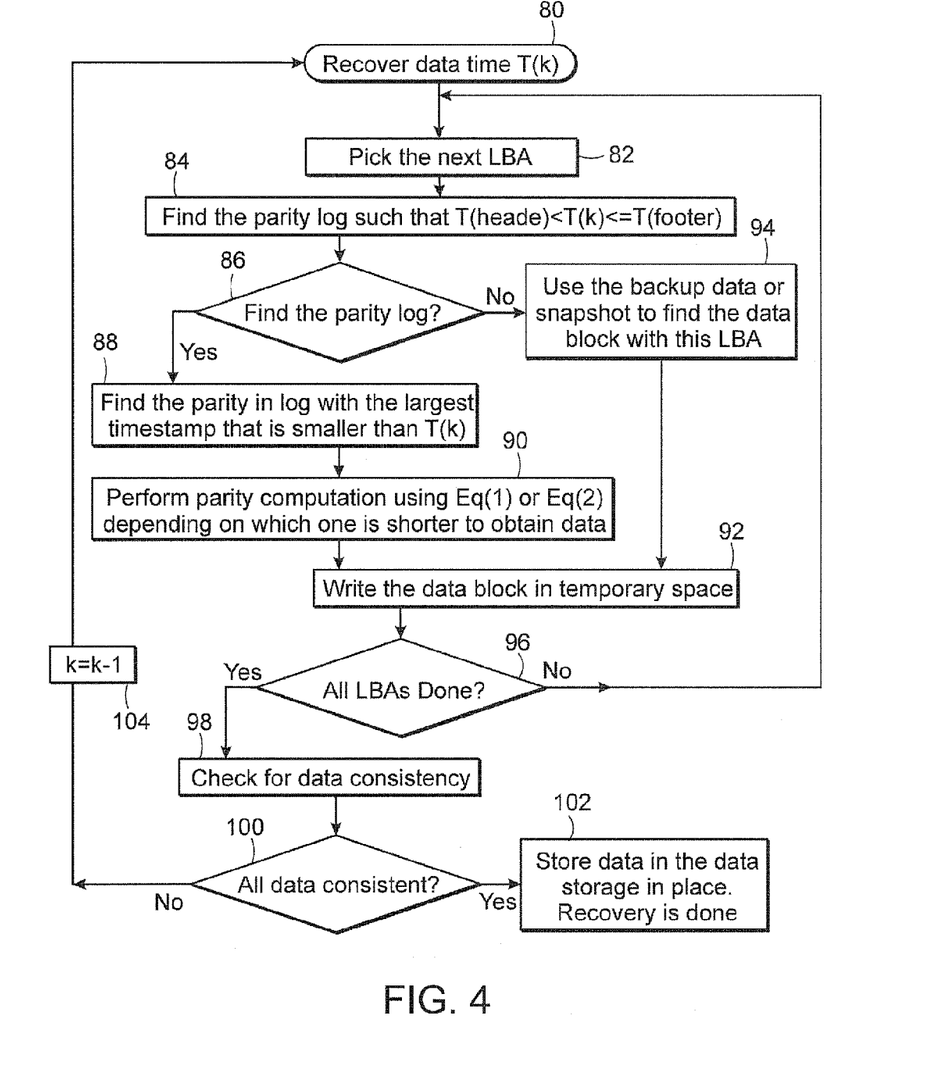
FIG. 4 shows an illustrative flowchart of a data recover process in a system in accordance with an embodiment of the invention.

As shown in FIG. 4, a data recovery process for recovering data to a time T(k) in a system accordance with an embodiment of the invention may begin (step 80) by picking the next LBA (step 82) and then finding the parity log such that T(header)<T(k)<=T(footer) (step 84). The system then determines whether the parity log was found (step 86). If so, the parity in the log with the largest timestamp that is smaller than T(k) is found (step 88) and the parity computation is performed (step 90). The parity computation may be performed using either of equations (2) or (3) above, whichever one will obtain the data most quickly. The data block is then written to a temporary space (step 92). If the system (step 86) did not find the parity log, then the system uses the backup data or a snapshot to find the data block with that LBA (step 94) prior to writing the data block into the temporary space (step 92).

The system then determines whether the logical block addresses have all been processed (step 96). If not, the system returns to step 82 and picks the next logical block address. If so, the system then checks for data consistency (step 98), and if all of the data is consistent (step 100), the system then stores the data in the existing data storage (step 102) and recovery is then finished. If the data is not all consistent (step 100), then the system increases the value k (step 102) and begins the process again at step 80.

The recovered data is in a crash consistency state. Techniques may also be possible to assist applications to quickly recover to the most recent consistent point at the application level. A bit error in the parity log could potentially break the entire log chain, which would not be the case for other systems that keeps all data blocks. There are two possible solutions to this: adding an error correcting code to each parity block or mirror the entire parity log. Fortunately, the system uses orders of magnitude less storage. Doubling parity log is still more efficient than conventional systems.

The parameters of storage space efficiency, RTO, and RPO are evaluated below in connection with performance impacts on various applications. A system of the invention was installed on a PC serving as a storage server as shown in FIG. 2. Four PCs were used that were interconnected using the Intel's NetStructure 10/100/1000 Mbps 470T switch. Two of the PCs act as clients running benchmarks. One PC acts as an application server. The hardware characteristics of the four PCs are shown below in Table 1.

| | |
|---|---|
| PC 1, 2, & 3 | P4 2.8GHz/256M RAM/80G + 10G Hard Disks |
| PC 4 | P4 2.4GHz/2GB RAM/200G + 10G Hard Disks |
| OS | Windows XP Professional SP2 |
| | Fedora 2 (Linux Kernel 2.4.20) |
| Databases | Oracle 10g for Microsoft Windows (32-bit) |
| | Postgres 7.1.3 for Linux |
| | MySQL 5.0 for Microsoft Windows |
| iSCSI | UNH iSCSI Initiator/Target 1.6 |
| | Microsoft iSCSI Initiator 2.0 |
| Benchmarks | TPC-C for Oracle (Hammerora) |
| | TPC-C for Postgres(TPCC-UVA) |
| | TPC-W Java Implementation |

-continued

| Network | File system micro-benchmarks<br>Intel NetStructure 470T Switch<br>Intel PRO/1000 XT Server Adapter (NIC) |

On top of the system module and the operating systems, three different types of databases were set up and two types of file systems were employed. The first benchmark, Transition Processing Performance Counsel for C standard specifications (TPC-C), is a well-known benchmark used to model the operational end of businesses where real-time transactions are processed. TPC-C simulates the execution of a set of distributed and online transactions (OLTP) for a period of between two and eight hours. It is set in the context of a wholesale supplier operating on a number of warehouses and their associated sales districts. TPC-C incorporates five types of transactions with different complexity for online and deferred execution on a database system. These transactions perform the basic operations on databases such as inserts, deletes, updates and so on. At the block storage level, these transactions will generate reads and writes that will change data blocks on disks.

A second benchmark, TPC-W, is a transactional web benchmark developed by Transaction Processing Performance Council that models an on-line bookstore. The benchmark comprises a set of operations on a web server and a backend database system. It simulates a typical on-line/E-commerce application environment. Typical operations include web browsing, shopping, and order processing.

Besides benchmarks operating on databases, file system micro-benchmarks were also formulated as listed in Table 2. The first micro-benchmark, tar, chooses five directories randomly on ext2 file system and creates an archive file using tar command. The tar command was run five times. Each time before the tar command was run, files in the directories were randomly selected and randomly changed. Similarly, zip, latex, and basic file operations cp/rm/mv were also run on five directories randomly chosen for 5 times with random file changes and operations on the directories. The actions in these commands and the file changes generate block level write requests.

| Benchmark | Brief description |
|---|---|
| tar | Run 5 times randomly on ext2 |
| gcc | Compile Postgres 7.1.2 source code on ext2 |
| zip | Compress an image directory on ext2 |
| Latex | Make DVI and PDF files with latex source files on ext2 |
| cp/rm/mv | Execute basic file operations (cp, rm and mv) on ext2 |
| Linux Install | Install Redhat 8.0 on VMWare 5.0 virtual machine |
| XP Install | Install Windows NIP system on VMWare 5.0 virtual machine |
| App Install | MS Office2000 and VC++ on Windows |
| VC++ 6.0 | Compile our TRAP implementation codes |

The first experiment is to measure the amount of storage space required to store TRAP data while miming benchmarks on three types of databases: Oracle, Postgres, and MySQL. Three types of architectures are considered: backup and snapshot (storing changed data blocks at the end of each run), continuous data protection (storing all versions of a data block as disk writes occur both with and with out data compression) and system of the invention (which keep parity logs, e.g., as described above). Experiments were carried out for 6 different parity block sizes: 512B, 4 KB, 8 KB, 16 KB, 32 KB, and 64 KB. Actual data sizes of disk write requests are independent of the parity block size but are aligned with parity blocks. If a write request changes a data block that is contained in a parity block, then only one parity computation is done. If a write request changes a data block that covers more than one parity block, more parity computations have to be done. Whether or not a write data is within one parity block depends on the starting LBA and the size of the write.

Figure 5:
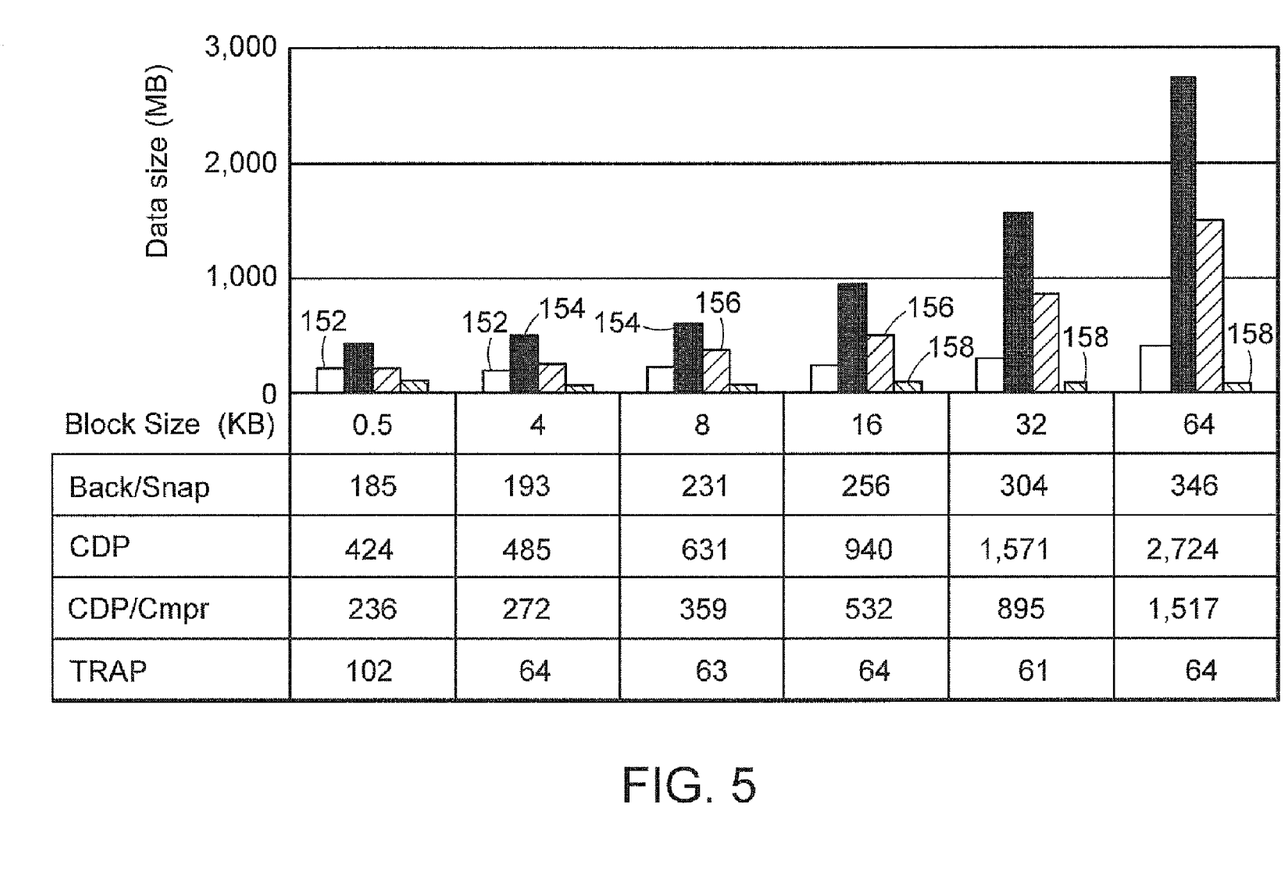
FIG. 5 shows an illustrative graphical representation of required data sizes for systems of the prior art and for a system of the invention for TPC-C for various block sizes.

FIG. 5 shows at 150 the measured results in terms of Mbytes of data stored in the storage for a comparison for TPC-C. There are six sets of bars corresponding to the six different block sizes. Each set contains four bars corresponding to the amount of data stored using back-up and snap shot 152, continuous data protection without compression 154, continuous data protection with compression 156 and a system of the invention 158. It is shown that systems of the invention present dramatic reductions in required storage space compared to other architectures. For the block size of 8 KB the system of the invention reduces the amount of data to be stored in the TRAP storage by an order of magnitude compared to the CDP/cmpr system. For the block size of 64 KB, the reduction is close to 2 orders of magnitude. It is interesting to observe that the system of the invention uses even smaller storage space than that used by a periodic backup system.

In this experiment, 25 users continuously generate transactions to 5 warehouses following the TPC-C specification with no thinking period. The amount of I/O requests generated with this workload in an hour is probably similar to one day's POs of medium size organizations. In this case, the amount of data in a back-up/snap shot system would be the amount of data for a daily backup. If this is the case, the system of the invention uses smaller storage space than daily backup while being able to recover data to any point-in-time. That is, with less storage space than a daily backup the system achieves near zero RPO as opposed to 24 hours RPO.

Figure 6:
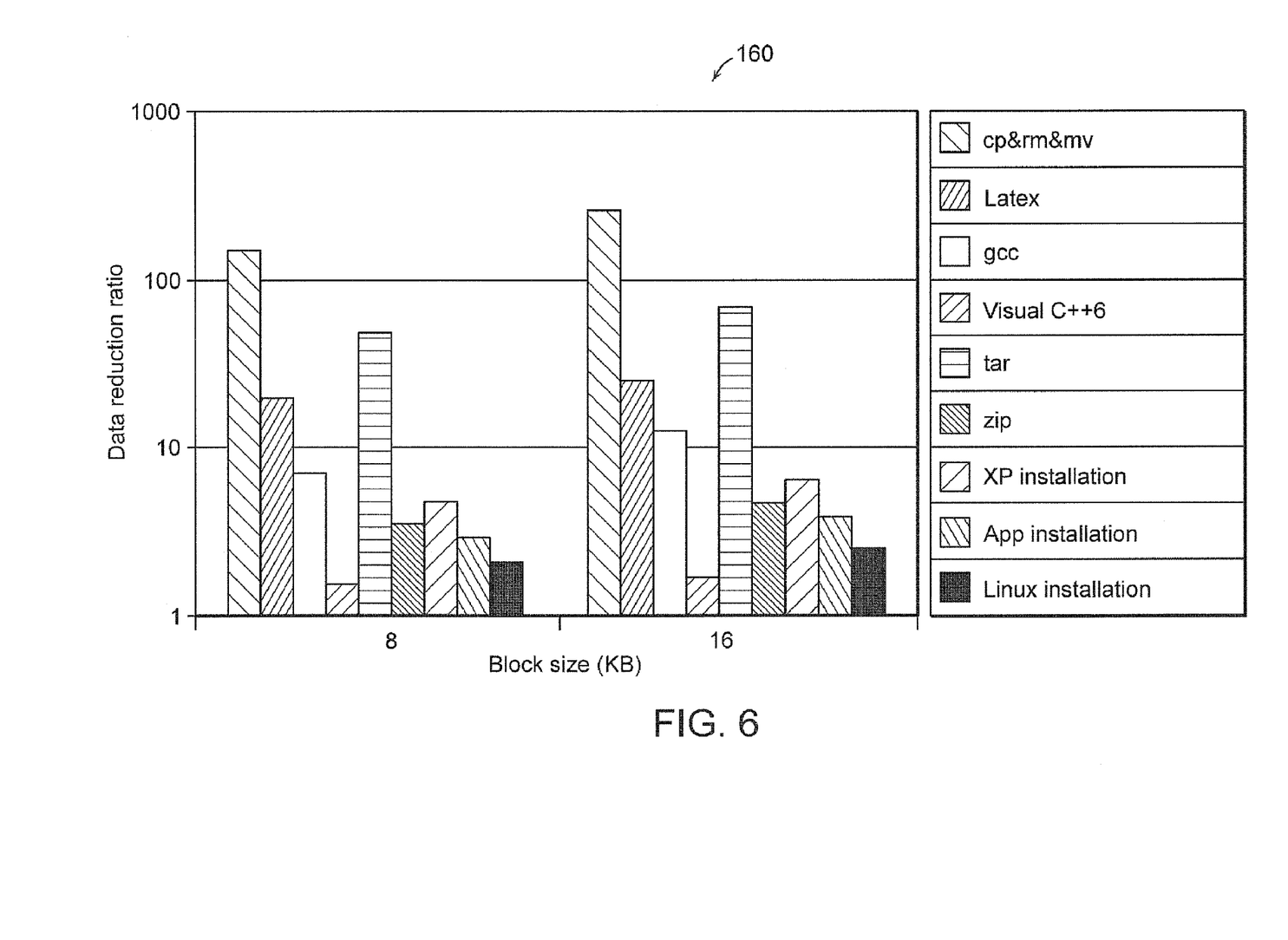
FIG. 6 shows an illustrative graphical representation of data reduction ratios for systems of the invention over a prior art system.

Other systems were also tested, and micro-benchmarks were also employed for evaluation. In particular, nine micro benchmarks are run for two different block sizes, 8 KB and 16 KB. Space savings of systems of the invention over conventional systems were found to vary from one application to another, but the largest gain was observed for cp/rm/mv commands and the smallest gain was observed for Visual C++6. The largest gain goes up to 2 orders of magnitude while the smallest gain is about 60%. The data reduction ratios of all micro benchmarks are shown in FIG. 10 in logarithmic scale. As shown at 160, the ratio varies between 1.6 and 256 times. The average gain for 8 KB block size is 28 times, and the average gain for 16 KB block size is 44 times.

Figure 7:
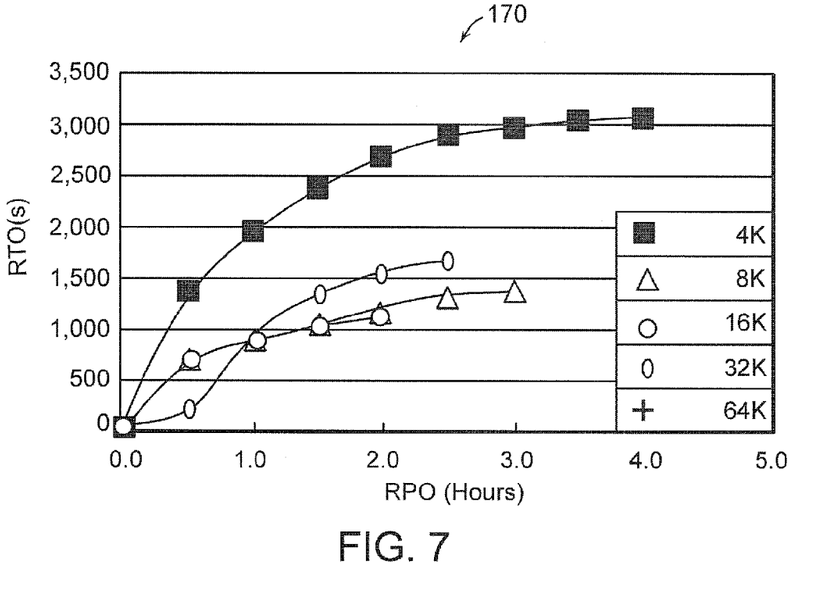
FIG. 7 shows an illustrative graphic representation of the relationship between RPO and RTO for systems of the invention.

FIG. 7 shows at 170 the RTO as functions of RPO for five different block sizes. Note that our recovery process is actually an undo process using Equation (3) as opposed to Equation (2) that represents a redo process. An undo process starts with the newest data and traces back the parity logs while redo process starts with a previous data and traces forward the parity logs. With the undo process, the RTO increases as RPO increases because the farther back the parity logs are traced, the longer time it takes to recover data. The results would be just the opposite if data is recovered using Equation (2). Depending on the types of outages and failure conditions, one can choose to use either process to recover data. For example, if the primary storage is damaged without newest data available, data must be recovered using a previous backup together with parity logs using Equation (2). On the other hand, if a user accidentally performed a wrong transaction, an undo process could be used to recover data using Equation (3).

Figure 8:
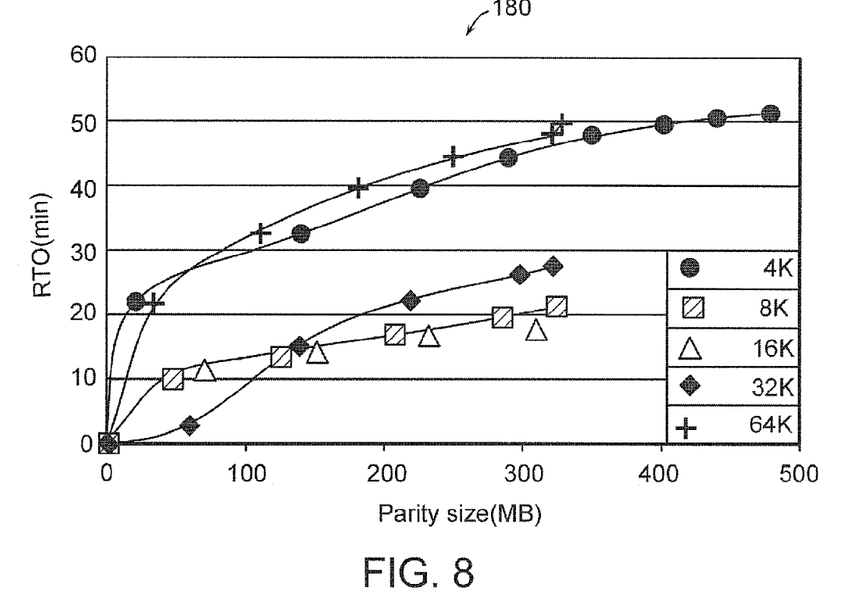
FIG. 8 shows an illustrative graphical representation of RTO versus parity size for a system of the invention.

Whether one performs an undo recovery using Equation (3) or a redo recovery using Equation (2), the RTO depends on the amount of parity data traversed during the recovery process. To illustrate this further, RTO was plotted as functions of parity log sizes traversed while doing recovery as shown at 180 in FIG. 8. The recovery time varies between a few seconds to about 1 hour for the data sizes considered. It should be noted that the amount of storage for TRAP-3 architecture is over 10 GB corresponding to the parity size of 300 MB. This may be used as a guide to users for choosing a shorter RTO recovery process depending on the RPO, the parity log size, and the availability of newest data or a previous backup.

During the recovery experiments it was observed that block sizes of 8 KB and 16 KB give the shortest recovery time. This result can be mainly attributed to the fact that most disk writes in the experiments fall into these block sizes. As a result, write sizes match well with parity block sizes. If the block size for parity computation were too large or too small, more parity computations and disk I/Os would have to be performed than necessary, resulting in longer recovery time and higher overhead as will be discussed shortly.

Table 3 shows below the measured computation time for XOR and the decoding process in a system of the invention implemented on PC1 as discussed above.

| Block Size(KB) | XOR(ms) | Decode(ms) |
| --- | --- | --- |
| 4 | 0.026414 | 0.073972 |
| 8 | 0.053807 | 0.132586 |
| 16 | 0.105502 | 0.213022 |
| 32 | 0.214943 | 0.335425 |
| 64 | 0.421863 | 0.603595 |

In order to compare the recovery time, RTO, the time it takes to do the XOR and decoding operations of the invention and that of the prior art were measured as shown in Table 3.

A new disk array architecture is therefore presented that is capable of providing timely recovery to any point-in-time for user data stored in the array, referred to as TRAP array. A prototype of the new TRAP architecture has been implemented as a block level device driver. File systems such as ext2 and NTFS, and databases such as Oracle, Postgres, and MySQL, have been installed on the prototype implementation. Standard benchmarks including TPC-C, TPC-W, and file system benchmarks are used to test the performance of the new storage architecture. Extensive experiments have demonstrated up to 2 orders of magnitude improvements in terms of storage efficiency. Recovery experiments have also been carried out several dozen times to show the quick recovery time of the new architecture. Measurements have also shown that the new architecture has little negative performance impact on application performance while providing continuous data protection capability.

Those skilled in the art will appreciate that numerous modifications and variations may be made to the above disclosed embodiments without departing from the spirit and scope of the invention.

What is claimed is:

1. A storage architecture for maintaining data in the event of data storage failure, said storage architecture comprising:
    a plurality of disks in a redundant disk array, each comprising a parity output bit that provides an indication of the parity of the data in each respective disk;
    a time-recovery disk in communication with at least one of said redundant disk arrays; and
    an encoder system coupled to said parity output bit of at least one of said disks and coupled to said time-recovery encoding data regarding whether a block of data in said at least one disk has been changed, wherein said encoding data is provided in a parity log.

2. A storage architecture for maintaining data in the event of data storage failure, said storage architecture comprising:
    a plurality of disks in a redundant disk array, each comprising a parity output bit that provides an indication of the parity of the data in each respective disk;
    a time-recovery disk in communication with at least one of said redundant disk arrays; and
    an encoder system coupled to said parity output bit of at least one of said disks and coupled to said time-recovery disk for providing encoding data regarding whether a block of data in said at least one disk has been changed, wherein said encoding data is provided in a plurality of parity logs.

3. A storage architecture for maintaining data in the event of data storage failure, said storage architecture comprising:
    a plurality of disks in a redundant disk array, each comprising a parity output bit that provides an indication of the parity of the data in each respective disk;
    a time-recovery disk in communication with at least one of said redundant disk arrays; and
    an encoder system coupled to said parity output bit of at least one of said disks and coupled to said time-recovery disk for providing encoding data regarding whether a block of data in said at least one disk has been changed, wherein said encoder system includes a time stamp circuit for providing that said encoding data includes time stamps.

4. A storage architecture for maintaining data in the event of data storage failure, said storage architecture comprising:
    a plurality of disks in a redundant disk array, each comprising a parity output bit that provides an indication of the parity of the data in each respective disk;
    a time-recovery disk in communication with at least one of said redundant disk arrays; and
    an encoder system coupled to said parity output bit of at least one of said disks and coupled to said time-recovery disk for providing encoding data regarding whether a block of data in said at least one disk has been changed, wherein said encoding data is provided as a plurality of blocks of parity data that each have a length that depends on the output of the parity output bit of the at least one of said disks.

5. A storage architecture for maintaining data in the event of data storage failure, said storage architecture comprising:
    a plurality of disks in a redundant disk array, each comprising a parity output bit that provides an indication of the parity of the data in each respective disk;
    an exclusive OR functionality circuit for providing an exclusive OR function of a parity output bit of at least one of said plurality of disks in the redundant disk array;
    an encoder circuit coupled to an output of said exclusive OR functionality circuit;
    a time stamp circuit coupled to said encoder circuit; and
    a time-recovery disk coupled to said encoder circuit for receiving a plurality of parity logs from said encoder circuit responsive to the output of said exclusive OR functionality circuit and responsive to an output of said time stamp circuit, said parity log including encoded data that is indicative of whether a block of data in said at least one disk has been changed.

6. The storage architecture as claimed in claim 5, wherein said encoded data is provided as a plurality of blocks of parity data that each have a length that depends on the output of the parity output bit of the at least one of said disks.

7. The storage architecture as claimed in claim 5, wherein said encoder system writes the encoding data to said time-recovery disk.

8. The storage architecture as claimed in claim 5, wherein said encoded data is stored in said time-recovery disk in a plurality of parity logs, each including a header and a footer.

9. The storage architecture as claimed in claim 8, wherein said encoder circuit determines whether a current parity log exceeds a predetermined size.

10. The storage architecture as claimed in claim 5, wherein said storage architecture further includes recovery means for recovering data that involves identifying a logic block address associated with lost data.

11. The storage architecture as claimed in claim 10, wherein said recovery means further involves employing at least one of backup data or snapshot data to identify the logic block address associated with the lost data.

12. A method of maintaining data in the event of data storage failure, said method comprising the steps of:
    providing a plurality of disks in a redundant disk array, each comprising a parity output bit that provides an indication of the parity of the data in each respective disk, at least one of said plurality of disks providing an exclusive OR function of a parity output bit of the at least one of said plurality of disks in the redundant disk array;
    encoding data provided by said exclusive OR functionality of said parity output bit to provide encoded data;
    time stamping said encoded data with a time stamp circuit that is coupled to said encoded data to provide time stamped encoded data; and
    providing said time stamped encoded data to a time-recovery disk.

13. The method as claimed in claim 12, wherein said encoded data is provided as a plurality of blocks of parity data that each have a length that depends on the output of the parity output bit of the at least one disks.

14. The method as claimed in claim 12, wherein said time stamped encoded data is provided as parity log data.

15. The method as claimed in claim 14, wherein said method further includes the step of determining whether a current parity log exceeds a predetermined size.

16. The method as claimed in claim 12, wherein said method further includes the step of recovering data that involves identifying a logic block address associated with lost data.

17. The method as claimed in claim 12, wherein said step of recover further involves employing at least one of backup data or snapshot data to identify the logic block address associated with the lost data.

* * * * *

UNITED STATES PATENT AND TRADEMARK OFFICE
CERTIFICATE OF CORRECTION

PATENT NO. : 7,730,347 B1  Page 1 of 1
APPLICATION NO. : 11/749901
DATED : June 1, 2010
INVENTOR(S) : Qing K. Yang It is certified that error appears in the above-identified patent and that said Letters Patent is hereby corrected as shown below:

In Col. 4, line 60, please delete "miming" and replace with "running".

In Col. 10, line 32, please delete "POs" and replace with "I/Os".

In Col. 12, line 4, Claim 1, after "time-recovery" please add "disk for providing".

Signed and Sealed this

Thirteenth Day of July, 2010

David J. Kappos
*Director of the United States Patent and Trademark Office*